United States Patent [19]

Sanftleben et al.

[11] Patent Number: 5,185,498
[45] Date of Patent: Feb. 9, 1993

[54] CIRCUIT ASSEMBLY ENCAPSULATED WITH POLYBUTADIENE URETHANE

[75] Inventors: Henry M. Sanftleben, Carmel, Ind.; Ralph D. Hermansen, North Ridge, Calif.; Gary R. Shelton, Kokomo, Ind.; Petrina L. Schnabel, Kokomo, Ind.; Dennis T. Baird, Kokomo, Ind.; Douglas C. Smith, Carmel, Ind.

[73] Assignees: Delco Electronics Corporation, Kokomo, Ind.; Hughes Aircraft Company, Los Angeles, Calif.

[21] Appl. No.: 714,148

[22] Filed: Jun. 11, 1991

[51] Int. Cl.⁵ .............................................. H01L 23/28
[52] U.S. Cl. .................... 174/52.2; 437/219; 437/224; 428/423.1; 257/788; 257/687
[58] Field of Search ............... 174/52.2, 52.3; 357/72, 357/73; 437/211, 213, 219, 224; 428/423.1

[56] References Cited

U.S. PATENT DOCUMENTS 4,871,477 10/1989 Dimanshteyn ..................... 252/609
5,079,270 1/1992 Burkhart et al. ..................... 521/117
5,079,275 1/1992 Durvasula et al. .................. 521/163

FOREIGN PATENT DOCUMENTS 56-115308 9/1981 Japan .
63-130617 6/1988 Japan .
1215817 8/1989 Japan .
2168855 6/1986 United Kingdom ............... 174/52.2

*Primary Examiner*—Leo P. Picard
*Assistant Examiner*—Bot L. Ledynh
*Attorney, Agent, or Firm*—Randy W. Tung

[57] ABSTRACT

An acceleration sensor is packaged in an open can and encapsulated in an elastomeric polybutadiene compound which maintains its mechanical properties over a range of −40° C. to 105° C. and transmits acceleration to the sensor with a unity transfer function. The encapsulation material comprises about 90 to 100 pbw of polyol and about 20 pbw of isocyanate, the polyol consisting of at least 70% of hydroxy-polybutadiene. For enhanced adhesion a foaming agent and/or an epoxy is added to the mixture.

4 Claims, 1 Drawing Sheet

CIRCUIT ASSEMBLY ENCAPSULATED WITH POLYBUTADIENE URETHANE

FIELD OF THE INVENTION

This invention relates to an encapsulated electrical assembly and particularly to an encapsulated acceleration sensor subject to thermal cycling.

BACKGROUND OF THE INVENTION

Supplementary inflatable restraints (air bags) in automobiles utilize an accelerometer or acceleration sensor located in the engine compartment where it is subject to extreme stresses resulting from thermal cycling or thermal shock. Where the accelerometer is a mechanical type it is mounted in an open container along with a printed circuit board and other components and surrounded by an encapsulation material to protect the sensor and other components from the environment. In addition to the thermally induced stresses the sensor assembly is subject to water, salt and other chemicals which could have a deleterious effect on the sensor performance. Thus integrity of the encapsulation is vital to prevent intrusion of harmful substances.

While the above considerations are generally true of any electrical assembly exposed to such a harsh environment, an additional requirement is made of the encapsulation material in the case of an acceleration sensor: the material must faithfully transmit the acceleration of the vehicle-mounted container to the sensor within the container. Expressed another way, the encapsulation material must have a transfer function of one with respect to acceleration.

Heretofore, encapsulation material for acceleration sensors comprised a MDI (methylene di-p-phenylene isocyanate) and castor oil based urethane which is implemented by pot on sand (POS) processing which comprises pouring mixed urethane over hot sand contained in the sensor container, or by vibrating hot sand into the urethane. The cured mixture provides environmental protection of the sensor element. Such material has a number of disadvantages. It is extremely difficult to process, and any processing error could result in a low reliability assembly. Even when correctly processed the assemblies do not pass rigorous environmental testing for water intrusion into the sensing element after salt spray or thermal cycling testing. Conformal coating of the printed circuit board is required to protect the board from the sand in the potting material, and since substantial vibration is required to evenly distribute the sand in the urethane, some fixturing (as by an adhesive) is used to hold the sensor element in place.

SUMMARY OF THE INVENTION

It is therefore an object of the invention to meet the requirements of the encapsulation material and pass all the rigorous testing while avoiding the shortcomings of the POS processing by defining the necessary mechanical and electrical properties to accomplish that objective and to identify an easily processed material which meets the requirements.

The invention is carried out by an electrical assembly subject to high thermal stresses comprising: electrical components; container means for containing the electrical components; and encapsulating means in the container means and surrounding the electrical components for environmentally protecting the components comprising polybutadiene urethane having a hardness of 15 to 90 shore A, an elongation of 50 to 300%, a tensile strength of 75 to 900 psi, and a glass transition temperature below $-10°$ C., whereby the encapsulating means maintains its integrity under intense thermal cycling conditions to exclude foreign elements from the components.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

While the ensuing description is directed to an acceleration sensor and a potting compound especially formulated for that sensor, it is expected that the same technology applies as well to other sensor assemblies or other electrical circuit assemblies, particularly those which are exposed to harsh environments similar to vehicle under hood locations.

Figure 1:
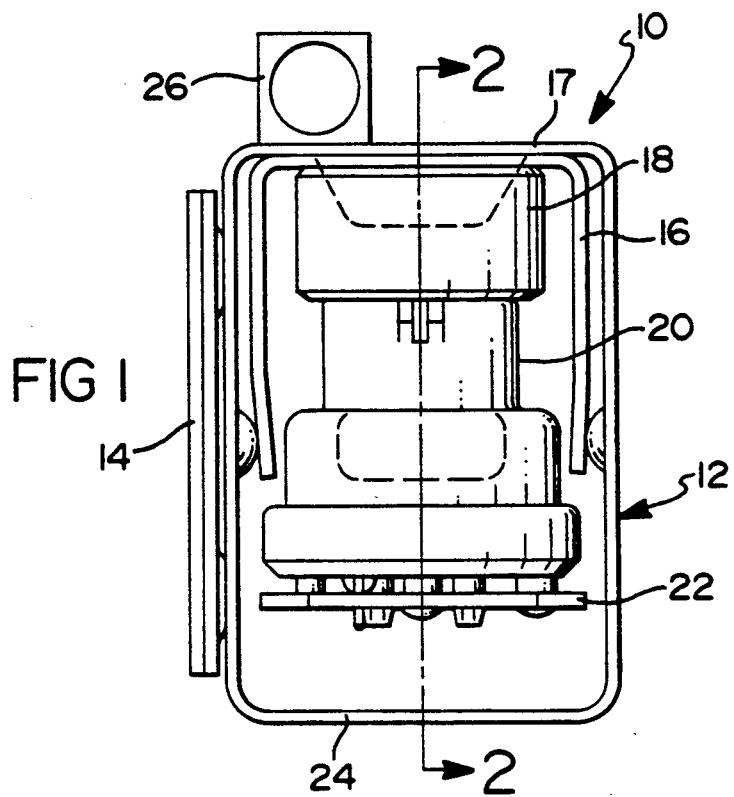
FIG. 1 is a plan view of an acceleration sensor assembly without encapsulation compound and FIG. 2 is a cross-sectional view along line 2-2 of FIG. 1 including the encapsulation compound according to the invention.
Figure 2:
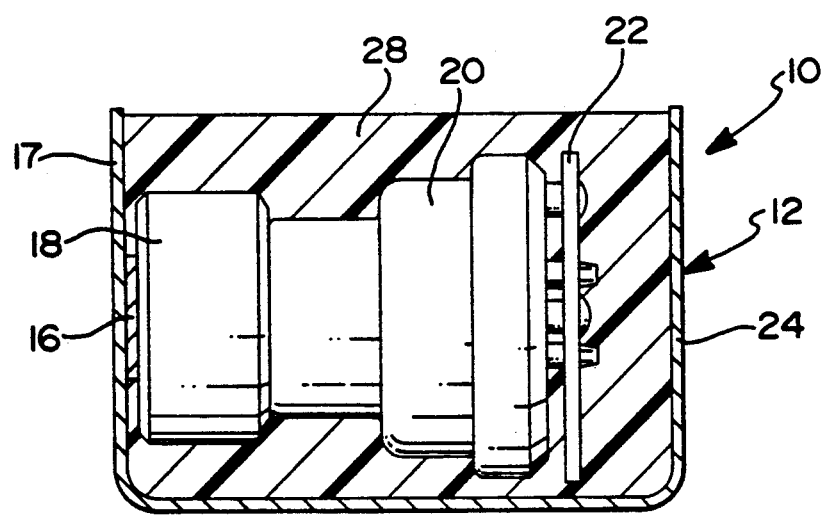

Referring to the drawings, a sensor assembly 10 comprises an open metal can 12 of generally rectangular shape which is welded or otherwise attached to an external mounting bracket 14 which is to be securely mounted to the vehicle. A U-shaped keeper 16 or flux director of ferromagnetic material is positioned in one end 17 of the can 12 (the rear end) and temporarily held in place with a drop of adhesive. A ceramic magnet 18 is located in the bight of the U-shaped keeper 16. A housing 20 is attached at one end to the magnet and carries a printed circuit board 22 on the other end, the circuit board being spaced by a small distance from the front end of the can 24 opposite to the keeper. The printed circuit board is electrically connected to circuitry within the housing and is also connected by wires (not shown) to an external connector 26 at the end of the can adjacent the keeper 16. As shown in the cross-sectional view of FIG. 2, the spaces in the can 12 surrounding the sensor component is filled with a potting compound 28. The housing 20 contains an electromechanical sensor which, with the magnet 18, senses acceleration in the front to rear direction. The potting compound 28 transmits the acceleration from the can 12 to the sensor housing 20.

The encapsulation material is a polybutadiene urethane which has the following mechanical properties which are measured, where appropriate, at 25° C.

|  | Max. Range | Preferred Range |
| --- | --- | --- |
| Elongation (%) | 50 to 300 | 90 to 200 |
| Tensile Strength (PSI) | 75 to 900 | 120 to 700 |
| Hardness (Durometer Shore A) | 15 to 90 | 25 to 65 |
| Glass Transition Temp (°C.) | $-10$ max | $-40$ max |
| Tear resistance (lb/in) | 15 to 120 | 35 to 100 |
| CTE (PPM/°C.) | 90 to 340 | 180 to 280 |
| Mixed Viscosity. (cps) | 200 to 30K | <15K |
| Shrinkage during cure (%) | 0 to 5 | 0 to 1 |

The coefficient of thermal expansion (CTE) should be as low as possible while remaining consistent with other properties. As the range of the CTE is reduced (e.g. 90 to 150 ppm) the physical properties may trend toward the minimum values in the table; if the CTE is in the 200 to 300 ppm° C. range the physical properties trend closer to the preferred range.

Materials with durometers less than 15 shore A will climb out of the can and do not provide sufficient support for the sensor element resulting in mechanical damage from thermal cycling and thrusting. Materials with durometers higher than 90 shore A probably will damage the sensor and printed circuit board during thermal cycling.

Minimum combinations of elongation, tear resistance, tensile strength and CTE are required to prevent cracking and tearing of the potting material during thermal cycling. Minimum properties are 50% elongation, 75 psi tensile strength, 20 lb/in tear strength, and 120 ppm/° C. CTE.

The polybutadiene urethanes have a very low glass transition temperature (Tg) compared with most other candidate potting compounds. Such low Tg materials are in an elastomeric state across the entire thermal cycling range. The potting compound is bonded to all of the components and the walls of the container of the assembly. During thermal cycling, stresses develop on the compound due to the CTE mismatches of the different materials in the assembly. However, the compound is elastomeric and therefore has appreciable free volume. The stressed elastomer can deform internally to alleviate the stress. It must do this in three dimensions.

The raw material is a two component mixture which is poured into the can containing the sensor and other components and cures quickly at a low temperature. Vastly improved processing is shown by the rejection rates for potting induced rejects dropped to a small fraction of that experienced with the POS method. The cured mixture adheres tightly to the walls of the can and to the components. No conformal coating is needed to protect the printed circuit board thereby further simplifying the process.

The resulting potting compound is a rubbery elastomeric material which provides an unexpected result: namely, it meets the requirement of unity transfer function for acceleration. Normally it is expected that only a rigid material would have such a transfer function; however it is found that this polybutadiene urethane when contained in the open can and bonded to the can and the components does indeed faithfully transmit acceleration from the can to the sensor and thus has the same transfer characteristic as a rigid compound.

Rigorous testing of the sensor assembly filled with the various encapsulant materials comprises three types of tests run on separate batches of assemblies: salt spray, water submersion and thermal cycling. A ten day salt spray test and a water submersion test are each begun by 168 hours of thermal cycle preconditioning of the parts. There the parts are exposed to $-60°$ C. air and then 130° C. air in 100 minute cycles for 168 hours; the part internal temperature reaching $-40°$ C. and 105° C. in each cycle. The water submersion test consists of 50 repetitions of a 45 minute heat soak at 105° C. followed by submersion at a depth of 30 cm in a water bath held at 0° C. for 10 minutes. The thermal cycling test is like the preconditioning but lasts for 1000 hours. Electrical test are run after the salt spray test and the thermal cycling test to determine whether the assembly has been compromised. The parts are weighed after the water submersion test. Except for unfilled polybutadiene urethanes, all types of prospective encapsulation materials gained weight during these tests indicating that water intrusion occurred. Of many materials tested, all unfilled epoxies, all filled epoxies, and most urethanes exhibited cracks in the material, the material pulled away from the case, or loss of adhesion to the sensor during thermal cycling. Even filled polybutadiene urethane gained some weight and thus failed the tests.

Another unexpected result is that unfilled polybutadiene urethane performed better than filled material. Typically fillers would be used in the formulation of potting compounds. They offer the advantage of lowering material costs, reducing exotherm, increasing thermal conductivity, and decreasing the CTE of the compound. The decreased thermal expansion is desirable since it could reduce stresses in the assembly during thermal cycling. However it was discovered during the rigorous testing that filled polybutadiene urethane suffered a weight gain while the unfilled material did not. It is now believed that the polybutadiene urethane pulled away from the filler particles, allowing water intrusion. Thus unfilled material is preferred for this application. Where some weight gain is acceptable, fillers up to 30% by weight may be included. A limiting factor is the viscosity of the mixed material which must be low enough to allow flow around the components when the material is being poured into the case. Fillers tend to increase the viscosity to an unacceptable degree.

The electrical properties of the polybutadiene urethane material were already known. The material has previously been used as a coating for voltage transformers and is prized for its weather resistance and insulation value. The required electrical properties for the encapsulating material are shown in the following table.

| | 25° C. | for $-40°$ to 125° C. max. range | preferred |
|---|---|---|---|
| Volume resistivity (ohm-cm) | $10^9$ min | $10^8$ to $10^{16}$ | $<10^{11}$ |
| Diel. Const. (1000 Hz) | 5.5 max | 3.9 to 6.0 | $<5.0$ |
| Loss Factor (1000 Hz) | 0.1 max | 0.1 to 0.001 | $<0.05$ |

The formulations of three polybutadiene urethane encapsulating materials which meet all the electrical and mechanical property requirements are set forth in the following table.

| Component | Compound #1 | Compound #2 | Compound #3 |
|---|---|---|---|
| polybutadiene | 90 pbw | 87 pbw | 80 pbw |
| polyol | 10 pbw | 13 pbw | 10 pbw |
| isocyanate | 20 pbw | 21 pbw | 20 pbw |
| black pigment | 3 pbw* | 1 pbw | — |
| catalyst (trace) | x | x | x |
| Lindy 4A sieve | — | 2 pbw | — |
| red pigment | — | 1 pbw | — |
| anti oxidant | — | 1 pbw | 1 pbw |
| epoxy | — | — | 10 pbw |
| defoamer | — | — | 0.1 pbw |

*Pigment is optional for compound #1.

In each case the polybutadiene component is preferably polyhydroxybutadiene (R45HT from Atochem). The polyol is a polyether diol or triol with average molecular weights of 200 to 1500 with 2 to 10 carbon atoms between oxygen atoms in the polymer backbone. A preferred polyether polyol is a polyether polyoxypropylene triol with an approximate molecular weight of 530 (PLURACOL ® TP440 from BASF). The isocyanate is diphenylmethane diisocyanate. This includes the 2,4′, the 4,4′ and 2,2′ isomers as well as the higher functional polyisocyanate and polymethylene polyphenyl mixtures, which may contain from about 20 to 85 weight percent of diphenylmethane diisocyanate isomers (ISONATE ® b 143L from Dow Chemical).

The epoxy is novalak epoxy resin (CARDOLITE ® NC-547 from Cardolite). This particular epoxy has the property of staying in solution in the polybutadiene system rather than crystallizing out. The anti-oxidant is a high molecular weight sterically hindered phenolic which may be multifunctional, such as, octadecyl 3,5-di-tert-butyl-4-hydroxyhydrocinnamate (IRGANOX ® 1076 from Ciba-Geigy) or tetrakis[methylene(3,5-di-tert-butyl-4-hydroxyhydrocinnamate)]methane (IRGANOX ® 1010 from Ciba-Geigy). The defoamer is an acrylic copolymer in a kerosene base which is available as PC-1244 from Monsanto.

Compounds #1 and #2 have equivalent properties. Development work on improvement of adhesion to PBT substrates demonstrated that the addition to compound #1 of 10 drops of the PC-1244 defoaming agent per 500 grams of polyol substantially doubled the adhesion as measured by lap shear tests. It was also shown that the substitution of the epoxy NC-547 for 10% of the polyol in compound #1 more than doubled the adhesion. Compound #3 has the same properties as compound #1 except that it has better adhesion as a result of the epoxy and the defoamer constituents. The enhanced adhesion improves the interfacial bond between the compound and the walls of the can or the components, thereby reducing the likelihood of water intrusion into the assembly.

In general the formulation ranges of the various constituents are as follows:

Isocyanate: A 2.0 to 2.4 NCO functionality is preferred but a range of 2.0 to 2.7 may be possible. The types of isocyanates may be modified MDI isocyanate, a crude polymeric MDI based isocyanate, other polymeric isocyanates, NCO terminated prepolymers, and aliphatic isocyanates.

Polyol: A blend of polyols consisting of 70 to 100% hydroxy-polybutadiene and one or more of the following polyols containing double bonds and/or oxygen in the polymer backbone; 1) polyether polyols (prefer 10% polyoxypropylene) having a fairly short chain for good thermal stability, 2) hydroxyl polyurethane prepolymers, and 3) a refined low moisture vegetable oil such as castor oil.

Additives: The preferred additives are;
A trace of a metallic catalyst such as butyltindilaurate;
Antioxidants as noted above, 0–3%.
Moisture collector, Lindy sieve 4A, about 2%.
Defoaming or wetting agent as noted above, about 0.1%.
Pigments such as non-conducting carbon black and/or iron oxide, 1–3%.
Other possible additives are:
Plasticizers or extenders such as phthalate ester, e.g. Di-(2-ethyl-hexyl) phthalate or a mineral oil.
Fillers to obtain 30,000 cps maximum viscosity of the mixture, comprising ceramic or glass beads, silica, talc, hollow microspheres, or alumina, 60 µm maximum size. These will lower CTE and shrinkage but raise the modulus and reduce tensile strength.
Short chain very reactive diamine, short chain very reactive polyol or N,N bis(2-hydroxypropyl) aniline for green strength.
Adhesion promoters, such as, amino functional silanes, e.g. gamma-aminopropyltriethoxysilane.

The embodiments of the invention in which an exclusive property or privilege is claimed are defined as follows:

1. An electrical assembly subject to high thermal stresses comprising:
   electrical components;
   container means for containing the electrical components; and
   encapsulating means in the container means and surrounding the electrical components for environmentally protecting the components comprising polybutadiene urethane having a glass transition temperature below −10° C., and mechanical properties at 25° C. of a hardness of 15 to 90 shore A durometer, an elongation of 50 to 300%, and a tensile strength of 75 to 900 psi, and whereby the encapsulating means maintains its integrity under intense thermal cycling conditions to exclude foreign elements from the components.

2. An electrical assembly subject to high thermal stresses comprising:
   electrical components;
   open container means for containing the electrical components; and
   polybutadiene urethane encapsulating material in the container means and bonded to the container means and to the electrical components for environmentally protecting the components, the material having a glass transition temperature below −40° C., and mechanical properties at 25° C. of 25 to 65 shore A durometer, 90 to 200% elongation, and 120 to 700 psi tensile strength, whereby the encapsulating material maintains its integrity under intense thermal cycling conditions to exclude foreign elements from the components.

3. The invention as defined in claim 2 wherein the material contains substantially no fillers.

4. The invention as defined in claim 2 wherein the material contains less than 30% fillers.

* * * * *